(12) United States Patent
Seibert et al.

(10) Patent No.: US 8,565,357 B2
(45) Date of Patent: Oct. 22, 2013

(54) DETECTION OF START FRAME DELIMITERS IN A WIRELESS DIGITAL COMMUNICATION SYSTEM

(75) Inventors: Cristina Seibert, Mountain View, CA (US); Edwin Shearer, Pleasanton, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 201 days.

(21) Appl. No.: 12/947,341

(22) Filed: Nov. 16, 2010

(65) Prior Publication Data

US 2011/0116534 A1     May 19, 2011

Related U.S. Application Data

(60) Provisional application No. 61/261,429, filed on Nov. 16, 2009, provisional application No. 61/261,430, filed on Nov. 16, 2009, provisional application No. 61/293,667, filed on Jan. 9, 2010.

(51) Int. Cl.
*H04L 27/06* (2006.01)

(52) U.S. Cl.
USPC .......................................... 375/343; 375/224

(58) Field of Classification Search
USPC .......... 375/343, 340, 224; 370/320, 335, 342, 370/441, 347, 515; 708/300, 422, 818, 819
See application file for complete search history.

(56) References Cited

U.S. PATENT DOCUMENTS

| | | | | |
|---|---|---|---|---|
| 5,151,920 | A * | 9/1992 | Haagh et al. | 375/150 |
| 5,903,613 | A * | 5/1999 | Ishida | 375/340 |
| 6,331,976 | B1 * | 12/2001 | Sriram | 370/350 |
| 6,480,559 | B1 | 11/2002 | Dabak | |
| 7,158,542 | B1 * | 1/2007 | Zeng et al. | 370/513 |
| 2002/0146085 | A1 | 10/2002 | Morris | |
| 2007/0086423 | A1 | 4/2007 | Zeng et al. | |
| 2008/0240166 | A1 * | 10/2008 | Gorday et al. | 370/514 |

FOREIGN PATENT DOCUMENTS

| | | |
|---|---|---|
| WO | WO 00/41355 | 7/2000 |
| WO | WO 2009/108586 | 9/2009 |

OTHER PUBLICATIONS

International Search Report (Form PTC/ISA/210) and the Written Opinion of the International Searching Authority (Form PCT/ISA/237) dated May 16, 2011, issued in the corresponding International Application No. PCT/US2010/002982.
Invitation to Pay Additional Fees and, Where Applicable, Protest Fee (Form PCT/ISA/206) dated Feb. 15, 2011, issued in the corresponding international Application No. PCT/US2010/002982.
Taiwanese Office Action issued on Jun. 25, 2013 in corresponding Taiwanese Patent Application No. 099139311.

* cited by examiner

*Primary Examiner* — Shuwang Liu
*Assistant Examiner* — Helene Tayong
(74) *Attorney, Agent, or Firm* — Buchanan Ingersoll & Rooney PC

(57) ABSTRACT

Forward error correction is used in conjunction with detection of a start frame delimiter (SFD) to provide flexibility and to reduce missed instances of an SFD. Candidate SFDs in an incoming signal are identified using a lower-than-normal detection threshold, and corresponding markers are stored in a buffer. For each stored marker, a physical layer header following the candidate SFD is decoded with error-correction techniques, to determine whether uncorrectable errors exist. If so, the candidate is discarded and the next candidate is evaluated. If no uncorrectable errors exist, the candidate is declared a valid SFD, and the remaining signal is decoded. Dual detection thresholds can be employed in networks that permit both error-encoded and non-coded packets. A technique for selecting SFD patterns that facilitate higher performance is also disclosed.

29 Claims, 5 Drawing Sheets

DETECTION OF START FRAME DELIMITERS IN A WIRELESS DIGITAL COMMUNICATION SYSTEM

RELATED APPLICATIONS

Priority is claimed from Provisional Application Nos. 61/261,429, filed Nov. 16, 2009; 61/261,430, filed Nov. 16, 2009; and 61/293,667, filed Jan. 9, 2010, the disclosures of which are incorporated herein by reference.

FIELD OF THE INVENTION

The present invention relates generally to wireless digital communication systems, and more particularly to the detection of a start frame delimiter (SFD) in the preambles of data packets transmitted via the communications system.

BACKGROUND OF THE INVENTION

Many wireless digital communication systems construct data to be transmitted into a burst that contains all of the information required by a receiver to demodulate the data. This burst of information is commonly known as a packet, which includes three main components, namely a synchronization header, a physical layer (PHY) header, and a payload. The synchronization header comprises a preamble followed by a start frame delimiter (SFD). The preamble is typically a predetermined pattern, e.g. an alternating sequence of binary 1's and 0's, to enable the receiver to acquire bit timing and frequency synchronization. The start frame delimiter is a unique sequence of bits that signals the end of the synchronization header and establishes a timing epoch that indicates the start of the PHY header. The PHY header contains information that enables the receiver to demodulate the message data. The payload contains the data to be conveyed to the receiver.

The present invention is particularly directed to the reliable detection of the SFD in the synch header of an incoming packet. The ability to reliably detect the SFD can have a positive influence on the overall performance of the communication system. For instance, if the detection criteria are quite stringent, e.g. little or no errors are acceptable for a positive detection, packets may be lost due to the inability to obtain a perfect match in the presence of noise or channel impairments that are inherent to a wireless communication system. Conversely, if the detection threshold is lowered to accept some error, false detections result in the unnecessary consumption of processing resources directed to attempts to decode bits that are not part of an actual frame.

In general, detected bits in a received signal are matched against a known SFD pattern, for example by correlating the incoming bits with a copy of the SFD. A correlation peak that exceeds a predetermined threshold indicates the detection of the SFD in the incoming signal. Preferably, the results of the correlation should show a clear peak at the matching point, but remain as small as possible for all other points. Consequently, the sequence of bits should be selected to avoid near misses that could result in false detections.

In some networks, multiple SFD patterns may be employed to differentiate between different types of packets that are exchanged in a network. For example, some of the packets may be encoded with forward error correction (FEC), to enable errors in a received packet to be identified and corrected. Other packets may be transmitted in an uncoded format, with no error correction capabilities. To enable the receiver to determine which type of packet is being received, different SFD patterns can be respectively assigned to the two different types of packets. While the added flexibility provided by such an arrangement can increase the range of applications that are supported in the network, this enhanced flexibility should not occur at the cost of a reduction in overall system performance. For instance, the two SFDs should have the property that their cross correlation is very good, so that one SFD is not confused with the other during the detection process.

In networks that employ forward error correction to improve the reliability of the received data in the presence of channel impairments, such as fading and noise, different respective FEC mechanisms may be employed for the PHY header and the payload, to satisfy system requirements. In such an arrangement, the error resilience of both mechanisms should be approximately balanced, to ensure that neither the PHY header nor the payload becomes a clear limiter of overall system performance.

In the same way that the PHY header and payload error resilience should be balanced, so should the ability to detect the SFD. However, when powerful FEC codes are used on the PHY header and the payload, it is difficult to construct a robust method for SFD detection that matches such performance. One approach is to increase the length of the SFD to gain more reliability, but for theoretical reasons this results in diminishing returns and becomes impractical. Furthermore, system constraints may limit the SFD length.

Another approach to increasing the probability of detection is to lower the threshold at which a peak is declared to be a match with a desired SFD. However, this method results in false peaks being declared as matches, and undermines the anticipated gains of lowering the threshold.

SUMMARY OF INVENTION

In accordance with one aspect of the invention, forward error correction is used in conjunction with detection of a start frame delimiter (SFD) to provide flexibility and to reduce missed instances of an SFD. Candidate SFDs in an incoming signal are identified using a lower-than-normal detection threshold, and corresponding markers are stored in a buffer. For each stored marker, a physical layer header following the candidate SFD is decoded with error-correction techniques, to determine whether uncorrectable errors exist. If so, the candidate is discarded and the next candidate is evaluated. If no uncorrectable errors exist, the candidate is declared a valid SFD, and the remaining signal is decoded.

In accordance with another aspect of the invention, dual detection thresholds can be employed in networks that permit both error-encoded and non-coded packets. For packets that are not encoded with error-correction, a first SFD pattern can be employed in conjunction with a higher (normal) detection threshold, to minimize false identification of an SFD. For encoded packets, a second SFD pattern can be detected with a lower threshold, to avoid missing SFDs in the presence of noise and other adverse network conditions.

A technique for selecting SFD patterns that facilitate higher performance is also disclosed. Various criteria are employed to ensure the sequence of bits in an SFD patterns, or sets of multiple SFD patterns, provide a discernable peak when a positive match occurs, and relatively low likelihood of a false positive when the pattern is not present in an incoming signal.

These and other features and advantages of the invention are described hereinafter with reference to exemplary embodiments illustrated in the accompanying figures.

BRIEF DESCRIPTION OF THE DRAWING FIGURES

DETAILED DESCRIPTION

To facilitate an understanding of the invention, examples are described hereinafter with reference to embodiments that conform to the IEEE 802.11 series of standards for medium access control (MAC) and physical layer (PHY) specifications in a wireless local area network (WLAN). It will be appreciated, however, that the principles upon which the invention is based are not limited to this particular application. Rather, they can be implemented in any wireless communication environment in which a defined pattern of bits, such as a start frame delimiter, is employed to establish a timing epoch that indicates the beginning of data that is being transmitted.

Figure 1:
FIG. 1 is a block diagram illustration of the components of a data packet.

A common construction for a message to be transmitted via a wireless digital communication system, e.g. a packet, is illustrated in FIG. 1. The initial bits of the packet 10 comprise a synchronization header preamble (SHR) which enables a receiver to acquire bit timing and frequency synchronization. The preamble might comprise, for example, an alternating sequence of binary 1 and 0 bits, and might have a length of 56 or 128 bits. The preamble of the synchronization header is followed by a start frame delimiter (SFD), to indicate the start of a PHY header and establish byte timing. The PHY header (PHR) provides information that enables the receiver to demodulate the message data, e.g. the rate and length of the data. The remaining portion of the packet constitutes the payload, which contains the data to be conveyed to the receiver.

Figure 2:
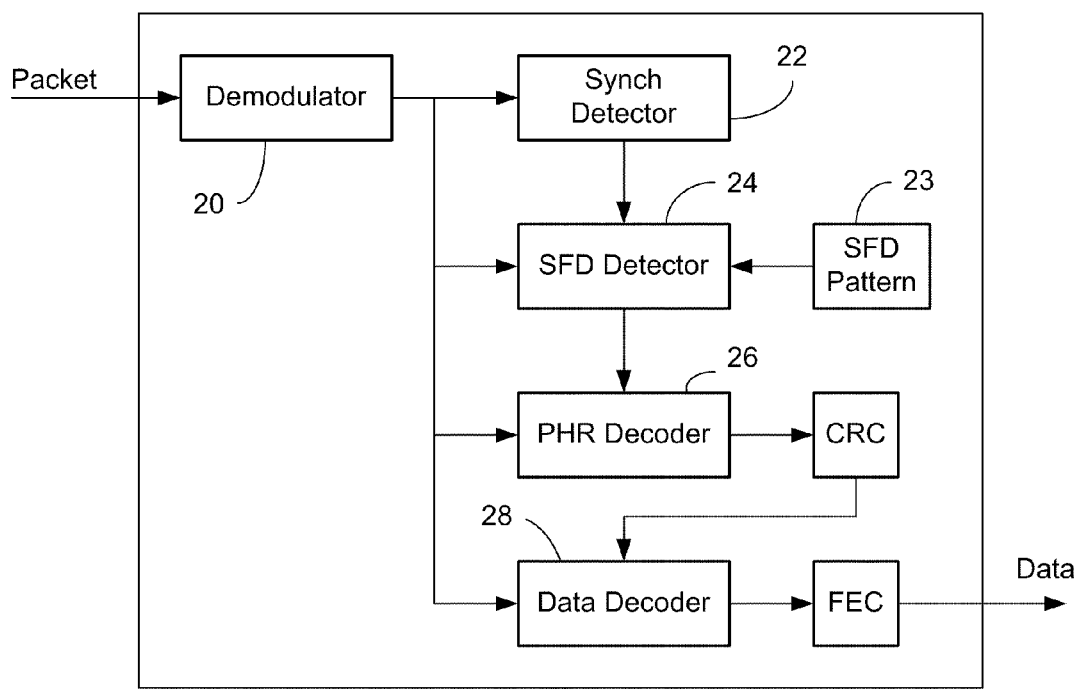
FIG. 2 is a block diagram of an exemplary receiver in a wireless network.

FIG. 2 is a logical block diagram of the components of a receiver in a wireless communications network. An incoming signal containing a data packet is first presented to a demodulator 20 that extracts the data signal from the carrier signal onto which it has been modulated. The extracted data signal is presented to a number of processing modules. The first such module is a synchronization detector 22, which looks for the predetermined bit sequence of the SHR preamble. Once the detector has identified and achieved synchronization with this pattern, it sends a signal to an SFD detector 24, informing that detector of the frequency and symbol timing (or phase) of the pattern. In essence, this signal functions as a clock signal for the SFD detector.

Upon receiving the clock signal from the synchronization detector 22, the SFD detector 24 compares the incoming bits of the data signal to a stored copy 23 of the SFD pattern. When the detector identifies a match between a sequence of bits in the data signal and the SFD pattern, it sends a trigger signal to cause a PHY header decoder 26 to start processing the data signal. The timing of this trigger signal informs the PHR decoder 26 of the beginning of the PHY header in the data signal.

The PHR decoder 26 obtains information from the PHY header, such as the data rate and length of the payload, and provides it to a data decoder 28. If forward error correction is employed in the transmission protocol, the decoded information from the PHY header might first undergo an error checking procedure, e.g. a cyclic redundancy check (CRC), before being passed on to the data decoder 28.

The information provided by the PHR decoder also informs the data decoder 28 of the start of the payload in the data packet. In response to this information, the decoder 28 processes the bits of the payload, and applies any forward error correction that may be employed. The resulting data is then provided to an end-use device that constitutes a consumer of the received data.

The functions of each of the detectors and decoders can be implemented with hard-wired logic, or one or more processors programmed with program instructions stored in a suitable computer-readable storage medium, such as a magnetic or optical disc, a flash memory, or other similar non-transitory storage device. Likewise, they can be implemented with a combination of hardware circuitry and software programming.

Generally, the PHR decoder 26 and the data decoder 28 can remain idle until such time as the SFD is detected in the incoming signal. It can be appreciated that improper detection of the SFD, e.g. false positives, can result in unnecessary activation of the decoders, leading to waste of receiver system resources and inefficiencies in the overall system performance as they attempt to decode unintelligible sequences of bits.

Figure 3:
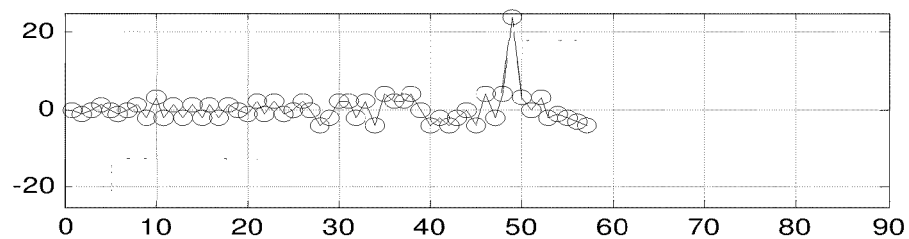
FIG. 3 is a diagram of the autocorrelation results for an exemplary SFD pattern.

The SFD comprises a pre-defined sequence of bits of length n. In the SFD detector 24 of the receiver, a sequence of n bits in the incoming signal is compared, on a bit-by-bit basis, against the stored copy 23 of the SFD. When the degree of matching exceeds a predetermined threshold, detection of the SFD is indicated. SFD matching is often performed by cross-correlation, using a sliding correlator in which the stored copy of the SFD is matched against each new sequence of n bits in the incoming signal. For each new received bit, the correlator generates a metric that indicates the degree of matching between the most recent sequence of n bits and the stored pattern, e.g. the percentage of bits in the sequence that match the corresponding bits of the pattern. When this metric exceeds a threshold value, a determination is made that the SFD has been found. To achieve good results, therefore, the sequence of bits that comprise the SFD should have autocorrelation properties which result in a high peak value at the correct timing epoch, and remain as small as possible for all other points. One example of a 24-bit SFD that exhibits this property is 0x85FCB3 (in hexadecimal format). The autocorrelation of this sequence is illustrated in FIG. 3. In essence, the autocorrelation represents the degree of matching that occurs by shifting an incoming sequence in time once synchronization is achieved, and comparing it against a copy of the pattern at each shift. As can be seen in FIG. 3, the autocorrelation exhibits a strong peak at time slot 49, which exceeds a threshold of 20 matching bits (out of 24), and remains well below that threshold for all other time slots. Thus, a reliable determination can be made that the timing epoch begins at time slot 49.

Figure 4:
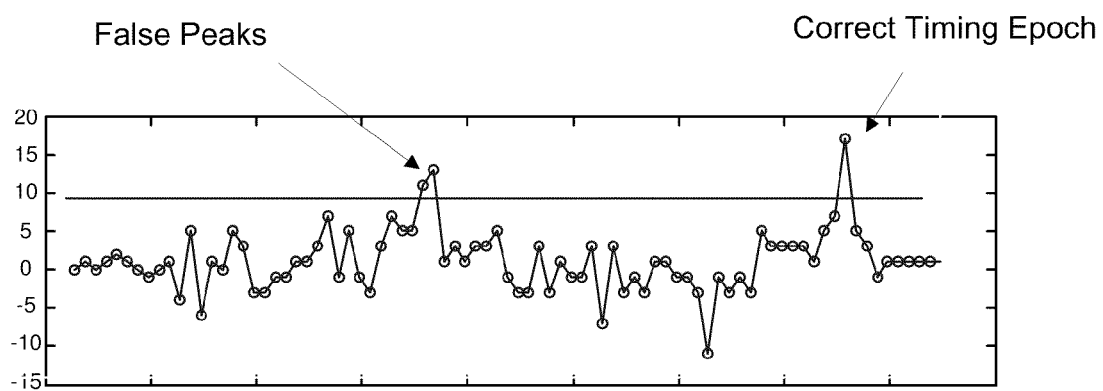
FIG. 4 is a diagram of illustrative results of cross-correlation of a signal with an SFD pattern, relative to a detection threshold.

One way to increase the probability of detecting the SFD is to lower the threshold at which a peak is declared to be the start of a timing epoch. However, such an approach may also result in an increase of the number of false peaks that are declared as epochs. To illustrate, FIG. 4 depicts a cross-correlation result in which a threshold value of approximately 10 matching bits is employed to detect the SFD. As can be seen, the cross-correlation exhibits a strong peak near the end of the sliding correlation. However, prior to this peak, two other false peaks appear that exceed the threshold. If either of these false peaks is declared to be the start of the timing epoch, the decoded signal would result in unintelligible data, and degrade system performance.

To improve the reliability of the data in the PHR and payload, in the presence of channel impairments such as fading and noise, many systems employ various methods of forward error correction (FEC). In such systems, the ability to detect the SFD should be balanced with the error resilience of the FEC mechanisms.

In accordance with one aspect of the invention, the ability of an FEC coding technique to detect uncorrectable errors is employed to validate whether a detected peak corresponds to a true epoch. As a result, the detection threshold can be significantly lowered to achieve more sensitive detection, without adversely increasing the number of false detections. This procedure is described with reference to the flow charts of FIGS. 5A and 5B, and the circuit of FIG. 5C.

Figure 5A:
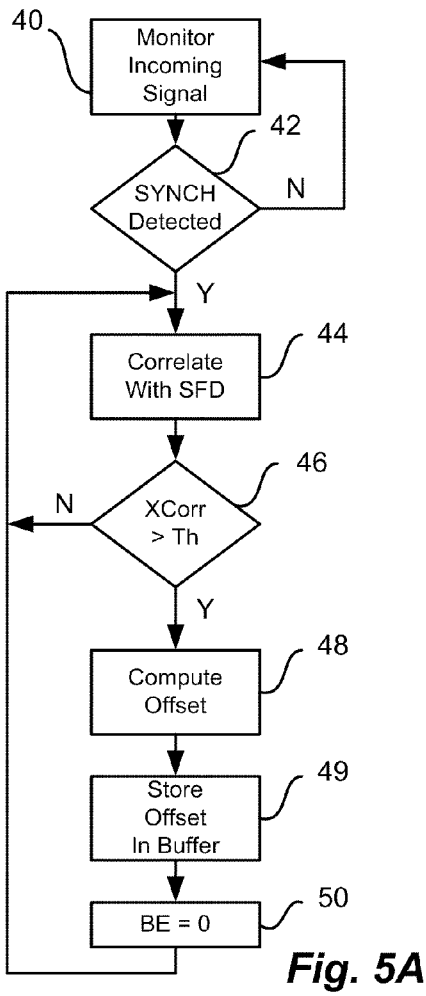
FIGS. 5A and 5B are flowcharts of a procedure for identifying a timing epoch, using forward error correction techniques.

Referring to FIG. 5A, at step 40 a received signal is continuously monitored by the synchronization detector 22, to detect the synchronization pattern. Once the synchronization preamble of an incoming signal is identified at step 42, and bit synchronization is established, the SFD detector 24 is activated at step 44 to search for the SFD in the signal. A correlation metric XCorr produced by a cross-correlator in the detector is compared to a predetermined threshold Th as each incoming bit is received, at step 46. If the metric exceeds the threshold, an offset to where the PHR is assumed to start is computed at step 48. For example, if the SFD has a length of 24 bits, the PHR is assumed to start at the next bit immediately following the received sequence of bits that were compared against the stored SFD and produced the correlation peak that exceeded the threshold. The offset is computed from a designated point in the sequence of incoming bits that have been detected, e.g. the point at which synchronization was achieved.

The computed offset is stored in a buffer 25 as a candidate for the PHR, at step 49, and a Buffer Empty flag BE is reset to zero at step 50, to indicate that the buffer contains data. In addition, the incoming signal is stored in a signal memory 27. The process then returns to step 44, to continue to examine additional sequences as each new bit is received, and identify additional candidate PHRs whose offsets are also stored in the buffer 25. As an alternative to an offset, any other form of a marker that identifies the beginning of the candidate PHR can be employed, such as a specific address location in the memory 27.

Figure 5B:
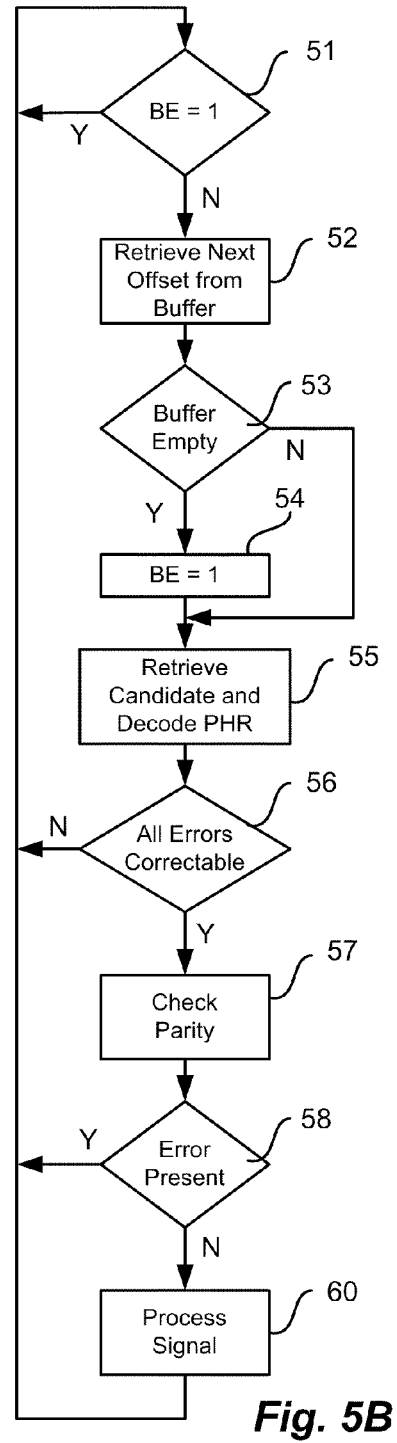
Figure 5C:
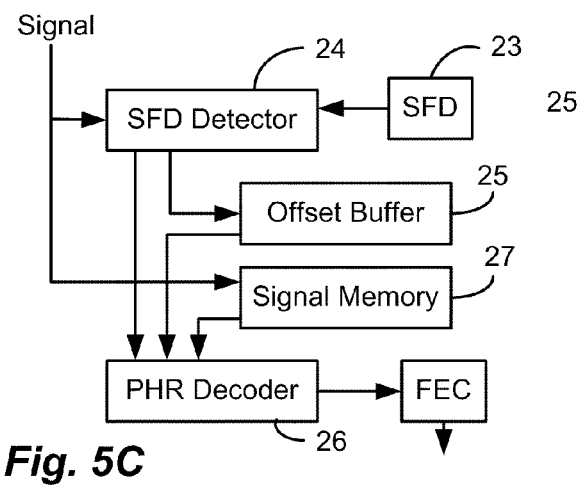
FIG. 5C is a detailed view of the SFD detector and PHR decoder portions of a receiver, in accordance with one embodiment of the invention.

Referring to FIG. 5B, at step 51 the status of the flag BE is monitored by the PHR decoder 26. If the flag is reset to zero, indicating that the buffer contains at least one candidate offset, the offset is retrieved from the buffer 25 at step 52. The buffer is checked at step 53, and if it is empty the flag BE is set to 1 at step 54. If the buffer contains at least one additional candidate offset, the flag is left in its reset state. At step 55, the candidate PHR that begins at the retrieved offset is read from the signal memory 27, and the FEC decoding procedure is applied, to correct any bits of the PHR that may be in error. At step 56, a determination is made whether there were any uncorrectable errors in the candidate PHR. If so, the detected peak is declared as a false peak, and the procedure returns to step 51 to determine if a marker for another candidate is present in the buffer. If a marker is present, steps 52-58 are repeated to evaluate the new candidate. At this point, all of the signal bits stored in the memory 27 that precede the new candidate, e.g., the bits associated with false peak, can be erased from the memory.

In one embodiment, if no uncorrectable errors are discovered by the FEC decoding procedure at step 56, the peak is declared as a valid peak, and processing of the payload, using the assumed start for the PHR, continues at step 60. In another embodiment, parity bits may also be included within the PHR, as an additional error detection mechanism. In this embodiment, if the FEC decoding procedure does not detect any uncorrectable errors at step 56, the parity bits are processed at step 57. A determination is made, at step 58, whether any other types of errors, which may not be detected by the FEC decoding procedure, are present. If so, the peak is declared to be a false peak, and the routine returns to step 51 to process the next candidate. Otherwise, the payload is processed at step 60.

In the foregoing embodiment, the PHR decoder continuously monitors the status of the BE flag, and initiates the FEC decoding procedure when the flag indicates that there is at least one offset stored in the buffer 25. In an alternative embodiment, at the time of storing an offset in the buffer 25, the SFD detector can determine whether the buffer was previously empty, e.g., the BE flag is being changed from 1 to 0. In that case, the SFD detector can send a trigger signal to the PHR detector, to initiate the decoding procedure. Thus, the PHR can remain completely idle until such time as a candidate PHR has been identified, rather than continuously monitoring the state of the BE flag.

EXAMPLE 1

A 16-bit SFD was chosen, represented in hexadecimal notation as 0xF3A0. The PHR comprised 16 bits of information indicative of the manner in which the payload was to be demodulated. A BCH (40, 16) truncated error-correcting code was employed to encode the PHR.

A simulation was constructed to measure performance of a network in which a packet, containing the foregoing SFD and PHR, was transmitted in the presence of additive white Gaussian noise, pseudo static Rayleigh fading. The results indicated that the sensitivity for combined SFD detection and subsequent correct PHR detection were improved by approximately 4-6 dB over a detection mechanism that did not employ the procedure depicted in FIGS. 5A and 5B. At the same time, the false detection rate was approximately $1e^{-3}$ if two parity bits are employed in the header. Addition of a third parity bit reduced the false error rate to a point that was not statistically significant.

In a variation of the foregoing technique, every bit in the incoming signal can be treated as the start of a new candidate for the PHR. Such an approach eliminates the need for the correlator and a stored SFD pattern. Rather, the process of FIG. 5B is carried out for each successive sequence of bits equal in number to the defined length of the PHR, e.g. 16 bits. For every such sequence, the retrieval and decoding step 55 is performed. It is likely that most received sequences will result in uncorrectable errors, in which case the process shifts one bit in the incoming signal to decode the next sequence of the defined length. If all errors in any examined sequence can be corrected, the process continues on to steps 57-60 for that sequence.

In some networks, multiple SFD patterns may be assigned to, and used to differentiate between, different types of data packets that are transmitted via the network. For example, one SFD pattern may be used for packets that do not employ forward error correction, and another SFD pattern can be assigned to data packets that are encoded with forward error correction. The added flexibility that is provided by the use of multiple SFD patterns can increase the range of applications that are supported in the network. However, this added flexibility should not occur at the cost of a reduction in overall system performance.

In accordance with another feature of the present invention, a multi-tier SFD detection scheme can be employed, in which different thresholds are used to detect different types of data packets. For an uncoded packet that does not employ forward error correction, bit errors in the received packet cannot be identified, and therefore a high degree of correlation between the incoming bits and the stored SFD pattern is preferably employed, to prevent false positives. For instance, a relatively high threshold, e.g. a match for at least 15 bits of a 16-bit pattern, can be employed to identify a positive match with an SFD pattern that is assigned to uncoded data packets.

In contrast, for a data packet that is encoded with forward error correction, a lower degree of correlation is tolerable. If a sequence of bits in the incoming signal results in a correlation metric that exceeds the lower threshold, the error-correction capability enables a determination to be made whether that sequence does, in fact, correspond to the SFD for an encoded packet, before activating the PHR and data decoders. In other words, while the use of a lower threshold may decrease the chances that a proper SFD will be missed in an incoming signal, it also increases the probability of false positive matches. However, by employing the lower threshold only for those SFD patterns that are assigned to encoded data packets, the false positive matches can be eliminated without expending significant resources. Conversely, for SFD patterns that are assigned to uncoded data packets, the higher threshold is employed to minimize the likelihood of false positive matches. The higher threshold that is employed for the detection of uncoded frames can be set according to the target frame detection rate, a desired false detection rate, and the length of the SFD, for example. The lower threshold that is employed in connection with encoded frames can be based upon these same factors, as well as the strength of the encoding scheme that is used.

The detection of the different respective SFDs can be performed sequentially, or in parallel. For example, in one embodiment, an incoming signal might first be processed to determine whether it contains an SFD assigned to an uncoded data packet, using the high threshold. If no match is found, the signal can be processed to determine whether it contains the SFD associated with the encoded data packets, using the lower threshold. In an alternative embodiment, two SFD detectors can operate in parallel, where one of the detectors is looking for a match for the SFD pattern associated with uncoded data packets, using the higher threshold, and the other detector determines whether there is a match for the SFD pattern assigned to encoded data packets, using the lower threshold.

When multiple unique SFDs are employed in a network, they should exhibit good cross-correlation, so that one SFD is not easily confused with the other. Barker and Golay codes are two examples of bit sequences that exhibit good autocorrelation properties, when used in specific applications. However, when applied to SFDs, they have certain limitations. For example, the longest Barker sequence is 13 bits. While the autocorrelation properties of these codes are good, their performance during synchronization can be suboptimal, such as in the presence of robust error correction, or when certain preamble patterns are used. Furthermore, there are not many choices of these codes that are applicable for use as an SFD.

In accordance with another feature of the invention, candidate SFDs are evaluated against a set of criteria to identify SFD sequences that are optimal. Exemplary criteria are as follows:

1. Balanced in terms of nearly equal numbers of 1's and 0's
2. Good autocorrelation properties
3. At least one orthogonal sequence which has good auto- and cross-correlation properties
4. Performance that is not adversely affected by correlating over the synchronization sequence
5. Provide the ability to reject inverses of itself and its orthogonal sequence caused by the possibility that the receiver may lock onto an image where the bits are inverted.

In this aspect of the invention, candidate SFD patterns are generated and sequentially tested against the criteria. An individual pattern can first be tested against certain ones of the criteria, e.g. determining the ratio of 1's and 0's so see how well balanced it is. If it meets a predetermined threshold, for instance the ratio falls within a range of 35-65%, it is evaluated against a suitable performance metric for another criterion. As soon as a pattern fails to meet a threshold for one of the criteria, it is rejected and the next candidate is evaluated. Pairs of SFDs, and other groupings of multiple SFDs, can also be evaluated against the criteria with the same approach.

With respect to the second criterion, an ideal autocorrelation should exhibit a high peak at the point of an exact match, and relatively low results at all other locations, as discussed in connection with FIG. 3. For purposes of evaluation of the suitability of a pattern as a candidate SFD, the autocorrelation results should reveal a discernable main peak, and every other peak should be no greater than a certain percentage of the value of the main peak. For example, the percentage can be around 80%, to provide a good buffer zone for establishing a threshold that can differentiate between the main peak and potential false positives.

For the third criterion, the orthogonal sequence should meet the first two criteria by itself, and the cross-correlation between the two sequences (the original candidate and the orthogonal sequence) should exhibit results in which the highest peak is no greater than the predetermined percentage of the highest peak in the autocorrelation of each of the two sequences. In other words, for two sequences A and B, the highest peak in the cross-correlation of A and B should be no more than 80% (or other suitable percentage) of the highest peak in the autocorrelation of A and the highest peak in the autocorrelation of B.

Similarly for the fourth criterion, the cross-correlation of the candidate pattern with the synchronization sequence, e.g. alternating pattern of ones and zeroes, should not have a peak that is more than the specified percentage of the highest peak in the autocorrelation of the sequence.

Finally, for the last criterion, the cross-correlation of the sequence and an inverse image of itself should not result in a peak that is more than the specified percentage of the highest autocorrelation peak. The same should hold true for the cross-correlation of the sequence and the inverse image of the orthogonal sequence.

In the foregoing discussion of exemplary metrics for evaluating the suitability of sequences for use as SFDs, individual peaks in the autocorrelations and cross-correlations are tested against the highest peak in the autocorrelation of a sequence. In addition, or as an alternative, the root mean square (rms) of the entire autocorrelation or cross-correlation can be compared to the highest peak of the same autocorrelation or cross-correlation. Preferably, the rms is no more than about 50% of the value of the highest peak, and more preferably less than 30%.

Once appropriate sequences that meet the criteria have been identified, they can be stored on computer-readable medium, such as a hard-disc drive of a communication server, an optical disk or a flash drive, from which one of the sequences can be read and inserted into data packets to be transmitted. The sequences stored on the computer-readable medium can be respectively associated with different types of data packets, such as error-correction encoded and uncoded data packets, for example. The particular sequence read from the computer-readable medium is selected in accordance with the coded or uncoded attribute of the data packet to be transmitted.

Figure 6:
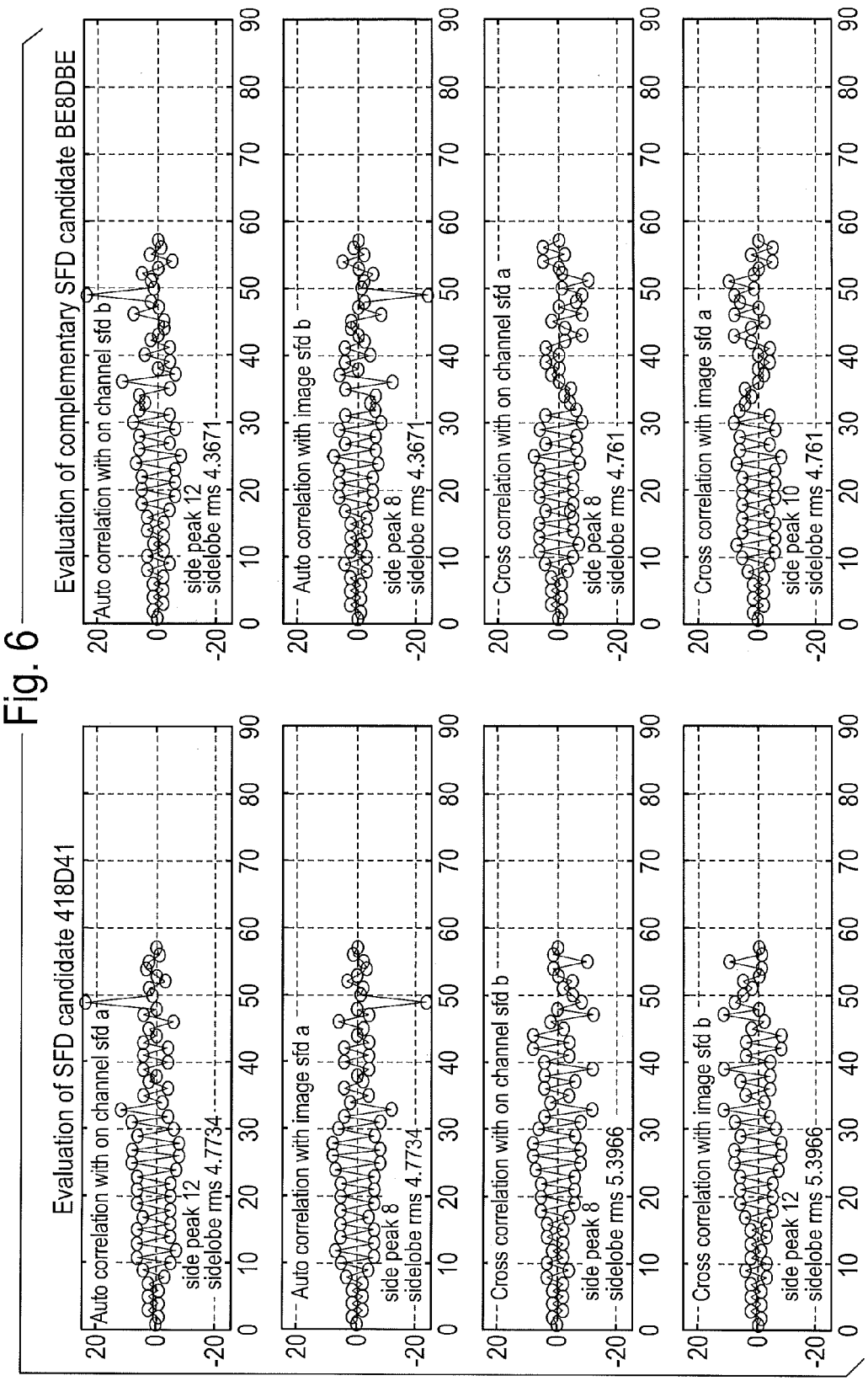
FIG. 6 illustrates autocorrelation and cross-correlation for a pair of sequences that exhibit less than satisfactory results.
Figure 7:
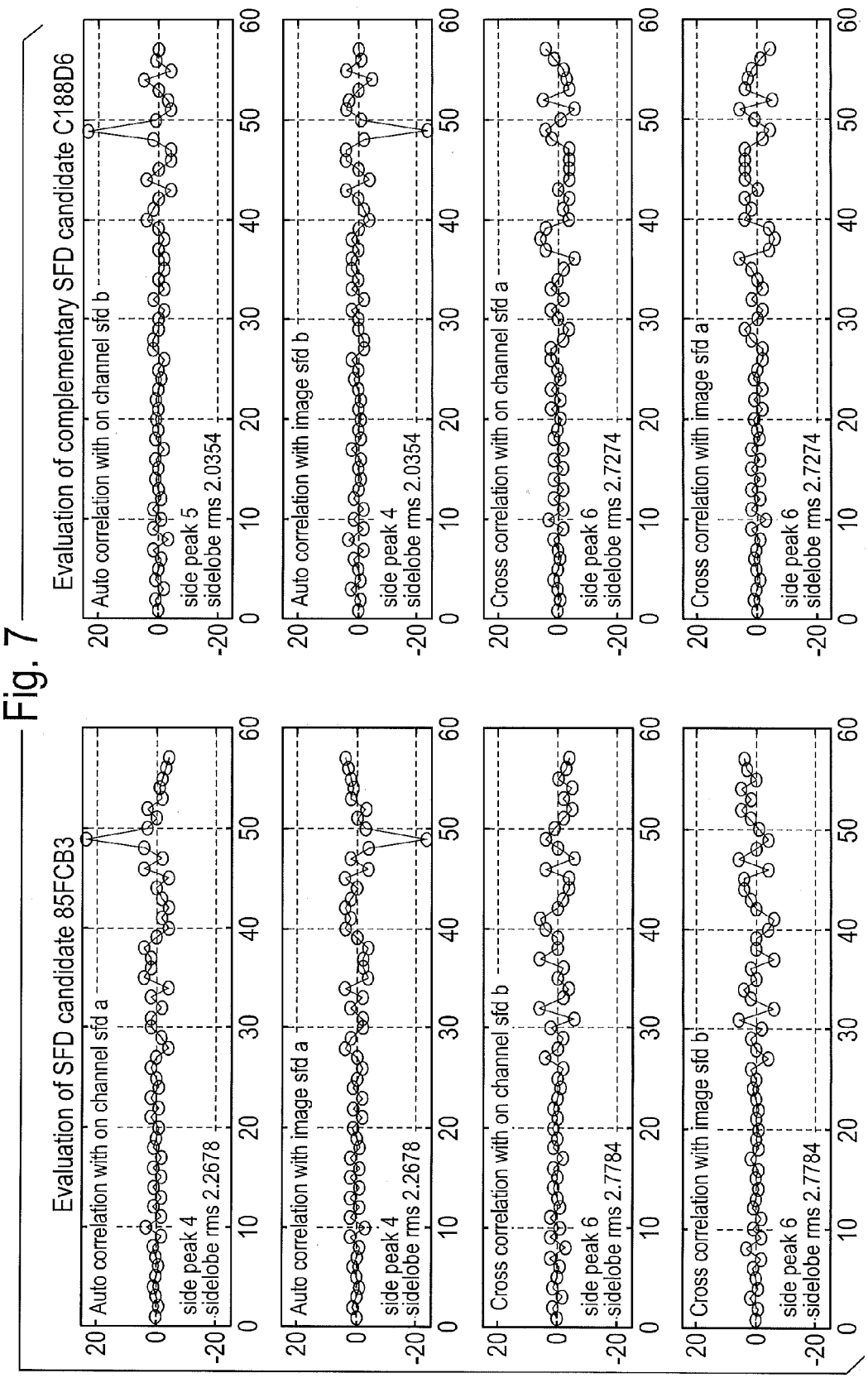
FIG. 7 illustrates autocorrelation and cross-correlation metrics for a pair of sequences that exhibit good results.

FIGS. 6 and 7 show simulation results that compare traditional sequences with sequences generated using the foregoing method. FIG. 6 illustrates the evaluation of a pair of candidate SFDs comprising the 24-bit hexadecimal sequences 418D41 and BE8 DBE, labeled "sfd a" and "sfd b", respectively.

Examining the first chart for each of the SFDs, the auto correlation performance reveals high returns of the correlator output when the SFD is matched against the incoming preamble. These high returns are almost 50% of the maximum peak and thus represent an extremely high probability of false detection. These high returns are visible also for the inverse image, shown in the second chart for each SFD, representing further possibility for false detection. Examination of the cross-correlation properties between sfd a and sfd b, and their respective images, shown in the last two charts, illustrate poor performance.

One pair of SFDs that satisfies the foregoing set of criteria is:
   sfd a=0x85FC83
   sfd b=0xC188D6
The evaluation of this pair of SFDs is depicted in FIG. 7. Examining the auto correlation performance (first chart) for each of these two SFDs reveals that the worst case return is significantly lower than the example of FIG. 6. Furthermore, the rms of these returns is only 9% of the peak value. The performance for the inverse image shown in the second chart is equally as good. Examination of the cross correlation properties between sfd a and sfd b also show excellent performance.

In addition to the foregoing example, other sets of SFD sequences that have been determined to exhibit suitable properties relative to the foregoing criteria are as follows:
   1. 0274E6 1A4C3F
   2. 034BB1 6E10D8 91E72F
   3. 036C72 67A112
   4. 016BB1 91E72F C4F9A7
   5. 846F8D 43EDBC
   6. 8469F9 43EB37 6E65F2
   7. 811 BCB 1E4EF1
   8. 8469F9 727BE1
   9. 849DE2 DCBE19
   10. 85FCB3 C188D6

While the foregoing examples comprise sets containing two or more sequences, it will be apparent that the selection criteria can also be used to identify a single sequence that can be used as a stand-alone SFD. In this case, the first, second and fourth criteria would be used.

The following exemplary psuedo code describes a search method to find two complementary SFD's of length NUMBITS that satisfy a number of the criteria:

```
The following criteria are used for initial selection of
SFD_candidate_a
       MAX_SIDELOBE_INITIAL
       MAX_SIDELOBE_RMS_INITIAL
The following criteria are used for final selection of
SFD_candidate_b including cross correlation with SFD_candidate_b
       MAX_SIDELOBE_FINAL
       MAX_SIDELOBE_RMS_FINAL
       MAX_SIDELOBE_RMS_AVG
The following criteria attempts to ensure that there are a similar
number of 1's and 0's
       TOO_MANY_1S_OR_0S
   for SFD_candidate_a = 0 to 2^NUMBITS-1
       if SFD_candidate_a has TOO_MANY_1S_OR_0S
       then break, and try a new SFD_candidate_a
The auto correlation properties of SFD_candidate_a are then
checked for "on channel" and "image"
       Compute cross correlation of SFD_candidate_a with incoming
signal containing preamble and SFD_candidate_a
       if any sidelobe peak is larger than MAX_SIDELOBE_INITIAL
           then break, and try a new SFD_candidate_a
       if the rms of the sidelobes is larger than
           MAX_SIDELOBE_RMS_INITIAL
           then break, and try a new SFD_candidate_a
       Compute cross correlation of negated SFD_candidate_a with
incoming signal containing preamble and SFD_candidate_a to assess
the risk of triggering on the image
       if any sidelobe peak is larger than MAX_SIDELOBE_INITIAL
           then break, and try a new SFD_candidate_a
       if the rms of the sidelobes is larger than
           MAX_SIDELOBE_RMS_INITIAL
           then break, and try a new SFD_candidate_a
At this point the SFD_candidate_a seems to be good so look for a
complementary sequence:
   for SFD_candidate_b = 0 to 2NUMBITS-1
       if SFD_candidate_b has TOO_MANY_1S_OR_0S
           then break, and try a new SFD_candidate_b
The auto correlation properties of SFD_candidate_b are then
checked for "on channel" and "image"
       Compute cross correlation of SFD_candidate_b with incoming
signal containing preamble and SFD_candidate_b
       if any sidelobe peak is larger than MAX_SIDELOBE_FINAL
           then break, and try a new SFD_candidate_b
       if the rms of the sidelobes is larger than
           MAX_SIDELOBE_RMS_FINAL
           then break, and try a new SFD_candidate_b
       Compute cross correlation of negated SFD_candidate_b with
incoming signal containing preamble and SFD_candidate_b to assess
the risk of triggering on the image
       if any sidelobe peak is larger than MAX_SIDELOBE_FINAL
           then break, and try a new SFD_candidate_b
       if the rms of the sidelobes is larger than
           MAX_SIDELOBE_RMS_FINAL
           then break, and try a new SFD_candidate_b
   The cross correlation properties of SFD_candidate_b with
SFD_candidate_a are checked for "on channel" and "image"
       Compute cross correlation of SFD_candidate_a with incoming
signal containing preamble and SFD_candidate_b
       if any sidelobe peak is larger than MAX_SIDELOBE_FINAL
           then break, and try a new SFD_candidate_b
       if the rms of the sidelobes is larger than
           MAX_SIDELOBE_RMS_FINAL
           then break, and try a new SFD_candidate_b
       Compute cross correlation of negated SFD_candidate_a with
incoming signal containing preamble and SFD_candidate_b to assess
the risk of triggering on the image
       if any sidelobe peak is larger than MAX_SIDELOBE_FINAL
           then break, and try a new SFD_candidate_b
       if the rms of the sidelobes is larger than
           MAX_SIDELOBE_RMS_FINAL
           then break, and try a new SFD_candidate_b
   The cross correlation properties of SFD_candidate_a with
```

-continued

```
SFD_candidate_b are checked for "on channel" and "image"
    Compute cross correlation of SFD_candidate_a with incoming
signal containing preamble and SFD_candidate_b
        if any sidelobe peak is larger than MAX_SIDELOBE_FINAL
            then break, and try a new SFD_candidate_b
        if the rms of the sidelobes is larger than
                MAX_SIDELOBE_RMS_FINAL
            then break, and try a new SFD_candidate_b
    Compute cross correlation of negated SFD_candidate_a with
incoming signal containing preamble and SFD_candidate_b to assess
the risk of triggering on the image
        if any sidelobe peak is larger than MAX_SIDELOBE_FINAL
            then break, and try a new SFD_candidate_b
        if the rms of the sidelobes is larger than
                MAX_SIDELOBE_RMS_FINAL
            then break, and try a new SFD_candidate_b
    Compute the average of the sidelobe rms's for each section
above
        if the average rms is larger than MAX_SIDELOBE_RMS_AVG
            then break, and try a new SFD_candidate_b
    At this point all of the criteria have been satisfied
        Save the value of SFD_candidate_a and SFD_candidate_b
        end
    Try the next SFD_candidate_b
        end
    Try the next SFD_candidate_a
```

From the foregoing, therefore, it can be seen that the present invention provides a flexible approach to the detection of the start of a frame of data in a received signal, while maintaining reliability. Through the use of forward error correction, lower detection thresholds can be employed to reduce the likelihood that an SFD will be missed, without increasing false positives that adversely affect system performance. Moreover, the advantageous use of error correction can be employed in networks that accommodate both coded and uncoded packets. A set of criteria for selecting optimal SFD sequences also provides increased performance by reducing false positives.

It will be appreciated by those of ordinary skill in the art that the concepts which underlie the present invention can be embodied in other specific forms without departing from the spirit or essential characteristics of the invention. The foregoing embodiments are therefore considered in all respects to be illustrative, and not restrictive. The scope of the invention is indicated by the accompanying claims, rather than the foregoing description, and all changes the come within the range of equivalents thereof are intended to be embraced therein.

What is claimed is:

1. A method for detecting a first start frame delimiter (SFD) and a second SFD for a received data packet in a network that utilizes multiple SFD patterns to distinguish between different types of data packets that are transmitted via the network, wherein the first start frame delimiter is different from the second frame delimiter, the method comprising the following steps:

performing a first correlation of successive bits in the received packet with the first start frame delimiter, and for each incoming bit of the received packet, generating a metric value that indicates a first degree of correlation;

if a generated metric value exceeds a first predetermined threshold, indicating the start of a timing epoch;

performing a second correlation of successive bits in the received packet with the second start frame delimiter, and for each incoming bit of the received packet, generating a metric value that indicates a second degree of correlation;

determining whether each metric value generated during the second correlation exceeds a second threshold value lower than the first threshold value; and if the metric value generated during the second correlation exceeds the second predetermined threshold, indicating a hypothetical start of a timing epoch.

2. The method of claim 1, further including the steps of:

decoding the bits at the hypothetical start of the timing epoch using forward error correction, and determining whether uncorrectable errors exist in the decoded bits; and a) if no uncorrectable errors exist, declaring the hypothetical start of the timing epoch as valid start of header information data, and processing the data of the frame, or b) if an uncorrectable error exists, repeating the decoding steps at successive hypotheticals for the start of the timing epoch until a determination is made that no uncorrectable errors exist.

3. The method of claim 2, wherein, if no uncorrectable errors exist in a group of bits that are decoded with forward error correction, performing the further step of processing the group of bits for parity errors, and processing the data of the frame if no parity errors are detected.

4. The method of claim 1, wherein the first start frame delimiter is associated with a frame having data that is not encoded with an error-correction technique, and the second frame delimiter is associated with a frame having data that is encoded with an error-correction technique.

5. The method of claim 1, wherein the first and second correlations are performed sequentially, and the second correlation is only performed if the metric generated during the first correlation does not exceed the first predetermined threshold.

6. The method of claim 1, wherein the first and second correlations are performed in parallel with one another.

7. The method of claim 1, wherein the steps associated with the second start frame delimiter comprise:

comparing a predetermined number of successive bits in a received signal with stored values for the second start frame delimiter having a length equal to said predetermined number of successive bits;

determining a metric indicative of the second degree of correlation between the successive bits of the received signal and the second start frame delimiter, for each of a plurality of sequences of said predetermined number of successive bits in the received signal; for each sequence whose metric exceeds a predefined threshold, storing a marker in memory that indicates a hypothetical start of header information data in the received signal;

decoding the bits at the hypothetical start of header information corresponding to the marker stored in the memory, using forward error correction, and determining whether uncorrectable errors exist in the decoded bits; and a) if no uncorrectable errors exist, declaring the hypothetical start of header information as valid start of a frame of data, and processing the data of the frame, or b) if an uncorrectable error exists, repeating the decoding steps for successive hypothetical start of header information corresponding to markers stored in the memory, until a determination is made that no uncorrectable errors exist.

8. The method of claim 7, wherein, if no uncorrectable errors exist in a group of bits that are decoded with forward error correction, performing the further step of processing the group of bits for parity errors, and processing the data of the frame if no parity errors are detected.

9. The method of claim 7, wherein the marker comprises an offset from a specified point in the sequence of bits of the received packet.

10. The method of claim 7, further including the step of storing the bits of the received signal in the memory, and retrieving the bits indicated by the marker from the memory, for decoding.

11. The method of claim 10, further including the step of erasing from the memory the stored bits of the received signal that precede the bits indicated by the marker.

12. A method for transmitting data packets in a network, comprising the following steps:
   selecting a start frame delimiter (SFD) pattern by:
   (i) selecting a sequence of bits comprising logical ones and zeroes as a candidates for the SFD pattern;
   (ii) evaluating the candidate SFD pattern to determine whether a ratio of ones and zeroes is within a predetermined range;
   (iii) if the ratio of ones and zeroes in the candidate SFD pattern is outside of the range, rejecting the selected sequence as the candidate SFD pattern, selecting a new sequence of bits as a candidate SFD pattern; and repeating steps (ii) and (iii), and
   (iv) if the ratio of ones and zeroes in the candidate SFD pattern lies within the range, evaluating the candidate SFD pattern with respect to at least one of the following criteria:
      autocorrelation properties of the sequence,
      cross-correlation properties of the sequence and an image of the sequence whose bits are inverted,
      cross-correlation properties of the sequence and a synchronization pattern employed in packets transmitted via the network; and
   (v) identifying the selected sequence as a valid SFD pattern if the sequence meets predetermined threshold values for each criterion against which the sequence is evaluated; and
   causing packets that contain the valid SFD pattern, to identify the start of header information in each packet, to be transmitted via the network.

13. The method of claim 12, wherein the predetermined range is 35% to 65%.

14. The method of claim 12, wherein at least two sequences are selected in step (i), and steps (ii)-(iv) are performed with respect to each sequence to identify sequences that form valid SFD pairs.

15. The method of claim 14, wherein step (iv) further includes the following criteria:
   cross-correlation properties of the two sequences,
   cross-correlation properties of one sequence and an image of the other sequence whose bits are inverted,
   cross-correlation properties of images of both sequence whose bits are inverted.

16. A method of transmitting data packets in a network, comprising the following steps:
   reading from a non-transitory computer-readable medium a start frame delimiter obtained by evaluating a sequence of bits against a plurality of criteria selected from a group comprising:
   a ratio of ones and zeroes within a predetermined range,
   autocorrelation properties of the sequence,
   cross-correlation properties of the sequence and an image of the sequence whose bits are inverted, and
   cross-correlation properties of the sequence and a synchronization pattern employed in packets transmitted via the network;
   selecting the start frame delimiter which is evaluated to meet the plurality of criteria;
   inserting the selected start frame delimiter into a data packet to delineate a synchronization header of the packet from the data of the packet; and
   causing the data packet with the inserted start frame delimiter to be transmitted via the network.

17. The method of claim 16, further including the step of selecting the start frame delimiter from a plurality of start frame delimiters stored on the non-transitory computer-readable medium, in accordance with an attribute of the data packet to be transmitted.

18. The method of claim 17, wherein the plurality of start frame delimiters are further evaluated against at least one of the following criteria:
   cross-correlation properties of two sequences that respectively form the plural start frame delimiters,
   cross-correlation properties of one sequence and an image of the other sequence whose bits are inverted,
   cross-correlation properties of images of both sequence whose bits are inverted.

19. A data receiver for detecting a first start frame delimiter (SFD) and a second SFD for a received data packet in a network that utilizes multiple SFD patterns to distinguish between different types of data packets that are transmitted via the network, wherein the first start frame delimiter is different from the second frame delimiter, the data receiver comprising:
   a start frame delimiter detector that is configured to:
   perform a first correlation of successive bits in the received packet with the first start frame delimiter, and for each incoming bit of the received packet, generating a metric value that indicates a first degree of correlation;
   if a generated metric value exceeds a first predetermined threshold, indicate the start of a timing epoch;
   perform a second correlation of successive bits in the received packet with the second start frame delimiter, and for each incoming bit of the received packet, generating a metric value that indicates a second degree of correlation;
   determining whether each metric value generated during the second correlation exceeds a second threshold value lower than the first threshold value; and
   if the metric value generated during the second correlation exceeds the second predetermined threshold, indicating a hypothetical start of a timing epoch.

20. The data receiver of claim 19, comprising:
   an error-correcting decoder that is configured to:
   decode the bits at the hypothetical start of the timing epoch using forward error correction, and determining whether uncorrectable errors exist in the decoded bits; and
   a) if no uncorrectable errors exist, declare the hypothetical start of the timing epoch as valid start of header information data, and processing the data of the frame, or
   b) if an uncorrectable error exists, repeat the decoding at successive hypotheticals for the start of the timing epoch until a determination is made that no uncorrectable errors exist.

21. The data receiver of claim 20, wherein, if no uncorrectable errors exist in a group of bits that are decoded with forward error correction, the decoder is configured to process the group of bits for parity errors, and process the data of the frame if no parity errors are detected.

22. The data receiver of claim 20, wherein the decoder is configured to: compare a predetermined number of successive bits in a received signal with a stored values for the second start frame delimiter having a length equal to said predetermined number of successive bits;

determine a metric indicative of the second degree of correlation between the successive bits of the received signal and the second start frame delimiter, for each of a plurality of sequences of said predetermined number of successive bits in the received signal;

for each sequence whose metric exceeds a predefined threshold, storing a marker in memory that indicates a hypothetical start of header information data in the received signal;

decode the bits at the hypothetical start of header information corresponding to the marker stored in the memory, using forward error correction, and determining whether uncorrectable errors exist in the decoded bits; and a) if no uncorrectable errors exist, declare the hypothetical start of header information as valid start of a frame of data, and processing the data of the frame, or b) if an uncorrectable error exists, repeat the decoding for successive hypothetical start of header information corresponding to markers stored in the memory, until a determination is made that no uncorrectable errors exist.

23. The data receiver of claim 22, wherein, if no uncorrectable errors exist in a group of bits that are decoded with forward error correction, the decoder is configured to process the group of bits for parity errors, and process the data of the frame if no parity errors are detected.

24. The data receiver of claim 22, wherein the marker comprises an offset from a specified point in the sequence of bits of the received packet.

25. The data receiver of claim 22, comprising a memory access unit configured to store the bits of the received signal in the memory, and retrieve the bits indicated by the marker from the memory, for decoding.

26. The data receiver of claim 25, wherein the decoder is configured to erase from the memory the stored bits of the received signal that precede the bits indicated by the marker.

27. The data receiver of 19, wherein the first start frame delimiter is associated with a frame having data that is not encoded with an error-correction technique, and the second frame delimiter is associated with a frame having data that is encoded with an error-correction technique.

28. The data receiver of claim 19, wherein the start frame delimiter detector is configured to perform the first and second correlations sequentially, and wherein the start frame delimiter detector is configured to perform the second correlation only if the metric generated during the first correlation does not exceed the first predetermined threshold.

29. The data receiver of claim 19, wherein the start frame delimiter detector is configured to perform the first and second correlations in parallel with one another.

* * * * *